(12) United States Patent
Peng et al.

(10) Patent No.: US 12,184,456 B1
(45) Date of Patent: Dec. 31, 2024

(54) FEED-FORWARD EQUALIZER

(71) Applicant: National Tsing Hua University, Hsinchu (TW)

(72) Inventors: Pen-Jui Peng, Hsinchu (TW); Sung-Li Tien, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 10 days.

(21) Appl. No.: 18/451,847

(22) Filed: Aug. 18, 2023

(30) Foreign Application Priority Data

Jun. 27, 2023  (TW) .................................. 112123876

(51) Int. Cl.
*H04L 25/03* (2006.01)
*H04L 25/06* (2006.01)

(52) U.S. Cl.
CPC ...... *H04L 25/03076* (2013.01); *H04L 25/062* (2013.01)

(58) Field of Classification Search
CPC .......... H04L 25/03076; H04L 25/062
USPC .......................... 375/229, 230, 232
See application file for complete search history.

(56) References Cited

U.S. PATENT DOCUMENTS

| | | | |
|---|---|---|---|
| 5,966,314 A | 10/1999 | Lee | |
| 7,130,366 B2 * | 10/2006 | Phanse | H04B 10/6971 375/232 |
| 8,976,854 B1 | 3/2015 | Healey et al. | |
| 2008/0260016 A1 | 10/2008 | Lapointe et al. | |
| 2015/0110165 A1 | 4/2015 | Ramadoss et al. | |
| 2019/0173586 A1 | 6/2019 | Cevrero et al. | |
| 2019/0305851 A1 | 10/2019 | Vegas-Olmos et al. | |
| 2019/0379357 A1 * | 12/2019 | Kang | H04L 25/03019 |

FOREIGN PATENT DOCUMENTS

CN          111526104          8/2020

OTHER PUBLICATIONS

"Office Action of Taiwan Counterpart Application", issued on Jul. 5, 2024, p. 1-p. 13.

* cited by examiner

*Primary Examiner* — David S Huang
(74) *Attorney, Agent, or Firm* — JCIPRNET

(57) ABSTRACT

A feed-forward equalizer includes a shift register, a look-up table circuit, a selection circuit and an output terminal. The shift register temporarily stores and shifts input data based on a clock signal to obtain multiple shifted input data. The look-up table circuit has multiple processed signals. The processed signals are obtained by logical operation of multiple coefficients. An input terminal of the selection circuit is coupled to the look-up table circuit. A control terminal of the selection circuit receives the shifted input data. The selection circuit selects at least one of the processed signals of the look-up table circuit as a selected signal based on the shifted input data. The output terminal provides an output signal according to the selected signal.

10 Claims, 5 Drawing Sheets

FEED-FORWARD EQUALIZER

CROSS-REFERENCE TO RELATED APPLICATION

This application claims the priority benefit of Taiwan application serial no. 112123876, filed on Jun. 27, 2023. The entirety of the above-mentioned patent application is hereby incorporated by reference herein and made a part of this specification.

BACKGROUND

Technical Field

The disclosure relates to a signal transceiving technology for wired communication, and in particular to a feed-forward equalizer (FFE) applicable to a pulse amplitude modulation 4-level transmitter.

Description of Related Art

As graphics processing units (GPUs), telecommunication networks, and mobile devices demand increasing computing power and data processing, wired and radio frequency (RF) transceivers are to operate at increasingly higher bandwidths, thereby exacerbating channel loss. In order to effectively compensate for channel loss, the transmitter circuit has a feed-forward equalizer to perform operations such as pre-emphasis and de-emphasis. However, due to the increased complexity of channel characteristics, how to solve the channel attenuation and design a feed-forward equalizer that may cover the compensation range of various channels has become an important issue to be faced.

A transmitter designed based on a digital-to-analog converter has excellent performance against channel compensation, and thus is valued by a communication system designer. The transmitter based on the digital-to-analog converter is composed of a digital-to-analog converter, a feed-forward equalizer based on digital signal processing, a serializer and other circuits. Although the transmitter has the advantage of resisting channel attenuation, the transmitter also needs to calculate multiple parallel data, resulting in a serious increase in the power consumption and area of the circuit. Under such circumstances, developing an innovative feed-forward equalizer design technology is an urgent need to achieve the goal of application to a high-bandwidth communication system.

SUMMARY

An embodiment of the disclosure provides a feed-forward equalizer, which may maintain the advantage of resisting channel attenuation, and can further reduce the loss of circuit area and power consumption.

The feed-forward equalizer in the embodiment of the disclosure includes a shift register, a look-up table circuit, a selection circuit and an output terminal. The shift register temporarily stores and shifts input data based on a clock signal to obtain multiple shifted input data. The look-up table circuit has multiple processed signals. The processed signals are obtained by logical operation of multiple coefficients. An input terminal of the selection circuit is coupled to the look-up table circuit. A control terminal of the selection circuit receives the shifted input data. The selection circuit selects at least one of the processed signals of the look-up table circuit as a selected signal based on the shifted input data. The output terminal provides an output signal according to the selected signal.

Based on the above, the feed-forward equalizer implemented based on the digital signal processing in the embodiment of the disclosure uses a fixed amount of hardware under different channel compensation amounts. In this way, the output impedance of the driver itself can be fixed, which facilitates channel impedance matching. Moreover, the feed-forward equalizer uses the two's complement form to weight and sum the coefficients of the data in the input signal, so that the combinational logic operation in the circuit may be realized with multiple adders, thereby avoiding the use of the multiplier, which not only can maintain the advantage of resisting channel attenuation, but also reduce the loss of circuit area and power consumption. The embodiment of the disclosure further allows the feed-forward equalizer to autonomously determine the position of the cursor to be compensated through coefficient distribution, thereby effectively improving the degree of freedom of circuit operation without increasing hardware costs. The feed-forward equalizer of the embodiment of the disclosure uses the resolution of expanding one bit so that the average error value is reduced to within one minimum bit.

DESCRIPTION OF THE EMBODIMENTS

Figure 1:
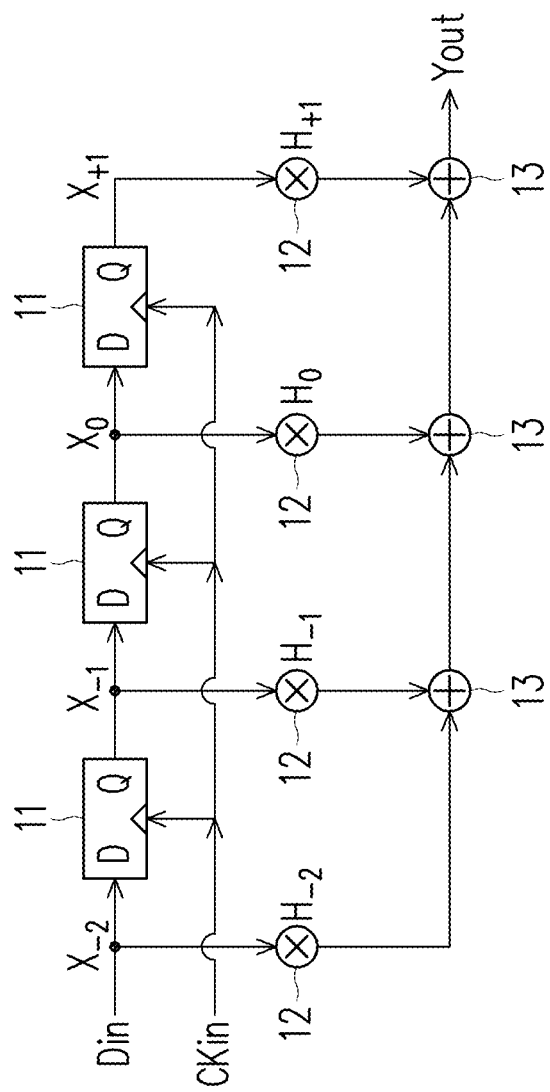
FIG. 1 presents a block diagram of a finite impulse response filter in an embodiment.

In an embodiment, a feed-forward equalizer based on digital signal processing uses operational logic and a digital-to-analog converter as an output circuit of a transmitter, and a signal for channel compensation may be generated. The feed-forward equalizer in the embodiment includes a finite impulse response filter. FIG. 1 presents a block diagram of a finite impulse response filter 10 in the embodiment. The finite impulse response filter 10 includes several flip-flops 11, several multipliers 12 and several adders 13. The finite impulse response filter 10 uses the flip-flops 11 and a clock signal CKin to delay an input signal Din for several clock cycles to generate delayed input signals (for example, data $X_{-2}$, $X_{-1}$, $X_0$ and $X_{+1}$). The finite impulse response filter 10 uses the multipliers 12 to multiply the delayed input signals (data $X_{-2}$, $X_{-1}$, $X_0$, and $X_{+1}$) by corresponding coefficients (for example, coefficients $H_{-2}$, $H_{-1}$, $H_0$ and $H_{+1}$) before performing summation to obtain a desired output signal $Y_{out}$. The data ($X_{-2}$, $X_{-1}$, $X_0$ and $X_{+1}$) are also referred to as the pre-cursor, the main-cursor and the post-cursor respectively. However, the multipliers 12 configured for parallel operation in FIG. 1 are to have a very considerable circuit area, and also indirectly lead to poor performance of the overall circuit. In addition, the finite impulse response filter 10 has a large number of combinational logic operations, which also generates a large amount of additional power consumption.

The feed-forward equalizer proposed by the embodiment of the disclosure uses a two's complement form to perform operations in combinational logic operations. Since the data type of the two's complement form may only be "0" or "1", the steps of multiplying the input signals by the coefficients before performing summation may be simplified as the method of using the coefficient and the input signal being "0" or "1" to respectively maintain the data thereof or inverting the number and adding one before performing summation, thereby allowing the embodiment of the disclosure to implement the aforementioned steps in the feed-forward equalizer by only requiring the use of multiple adders. In other words, the embodiment of the disclosure can use the two's complement form to carry out coefficient weighting and summation on the data in the input signal, thus avoiding the use of multipliers. In this way, the feed-forward equalizer of the embodiment of the disclosure can use the two's complement form to weight and sum the data in the input signal through the coefficient, and allow the combinational logic operation in the circuit to be realized with multiple adders. In this way, the use of multipliers can be avoided, which not only can maintain the advantage of resisting channel attenuation, but also can reduce the loss of circuit area and power consumption. Various embodiments consistent with the disclosure are illustrated below.

Figure 2:
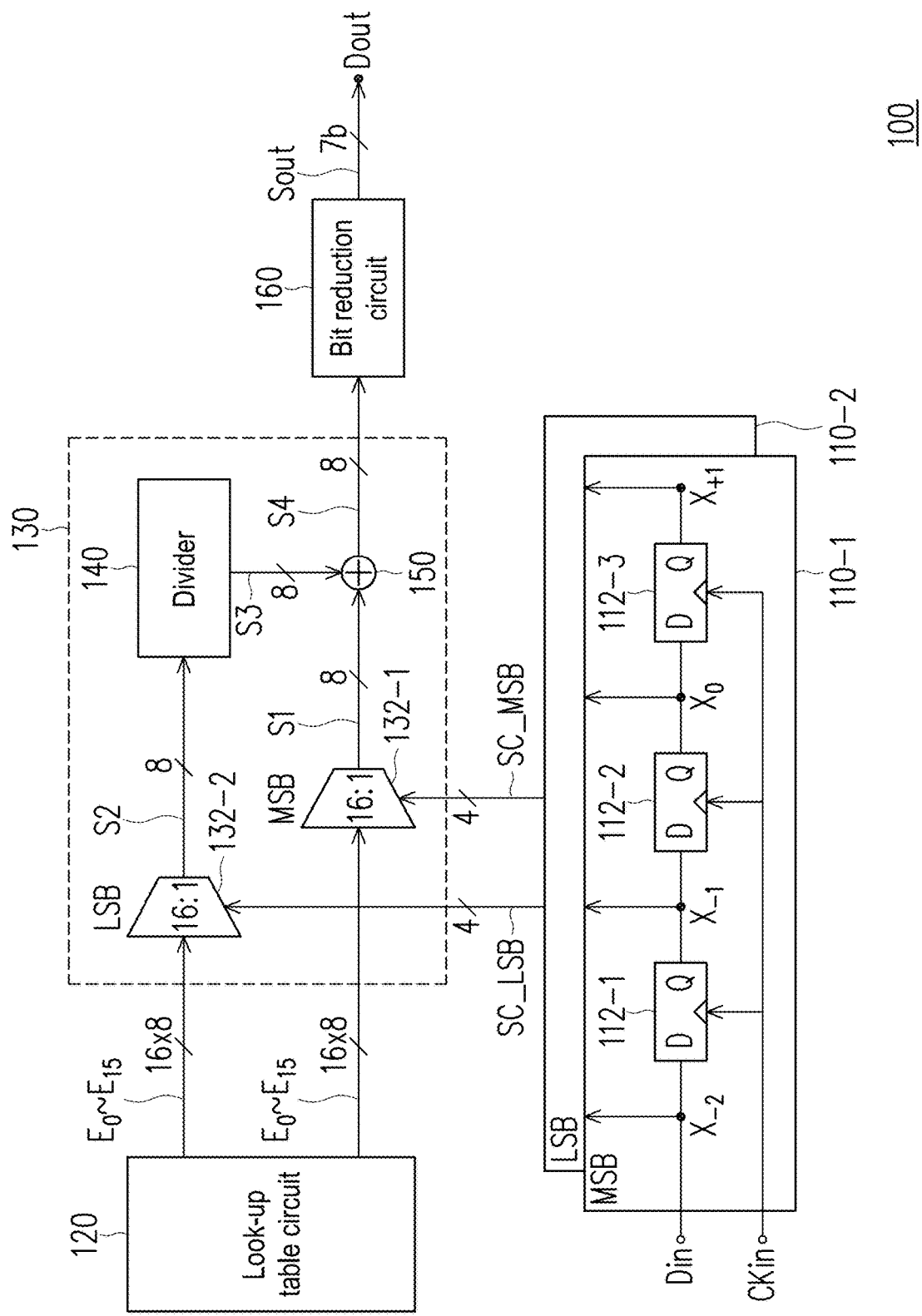
FIG. 2 is a block diagram of a feed-forward equalizer according to an embodiment of the disclosure.

FIG. 2 is a block diagram of a feed-forward equalizer according to an embodiment of the disclosure. A feed-forward equalizer 100 in FIG. 2 is a feed-forward equalizer configured for pulse amplitude modulation 4-level (PAM-4). The feed-forward equalizer 100 may be configured for a transmitter (TX) circuit or a transceiver circuit in the wired communication (such as Ethernet, the PCIE protocol and the USB protocol), a feed-forward equalizer (FFE) based on digital signal processing (DSP), a serializer deserializer (SerDes) transceiver, etc. The feed-forward equalizer 100 in FIG. 2 is applied to a digital-to-analog converter (DAC) based transmitter. Therefore, under different channel compensation amounts, the feed-forward equalizer 100 in FIG. 2 uses a fixed amount of hardware. In this way, the output impedance of a driver itself can be fixed, which facilitates channel impedance matching.

The feed-forward equalizer 100 includes a shift register, a look-up table circuit 120, a selection circuit 130 and an output terminal Dout. The shift register temporarily stores and shifts input data Din based on the clock signal CKin to obtain multiple shifted input data. In FIG. 2, the shift register includes a most significant bit (MSB) shift register 110-1 and a least significant bit (LSB) shift register 110-2. The MSB shift register 110-1 receives the clock signal CKin and the input data Din, and temporarily stores and shifts the input data Din based on the clock signal CKin. The input data Din consists of 4-bit data and is respectively represented as data $X_{+1}$, $X_0$, $X_{-1}$ and $X_{-2}$ to provide multiple MSB input data SC_MSB. On the other hand, the LSB shift register 110-2 receives the clock signal CKin and the input data Din, and based on the clock signal CKin, temporarily stores and shifts 4-bit data in the input data Din to provide multiple LSB input data SC_LSB. The number of bits of the MSB input data SC_MSB and the number of bits of the LSB input data SC_LSB are 4.

The MSB shift register 110-1 and the LSB shift register 110-2 in FIG. 2 are composed of multiple flip-flops (112-1 to 112-3 in FIG. 2) respectively. Control terminals of the flip-flops 112-1 to 112-3 are coupled to the clock signal CKin. An input terminal D of the flip-flop (for example, the flip-flop 112-2) of the next stage is coupled to an output terminal Q of the flip-flop (for example, the flip-flop 112-1) of the previous stage, and the first flip-flop (for example, the flip-flop 112-1) receives the input data Din. The data of the input terminal D of the flip-flop 112-1 is referred to as data $X_{+1}$; the data of the input terminal D of the flip-flop 112-2 is referred to as data $X_0$; the data of the input terminal D of the flip-flop 112-3 is referred to as data $X_{-1}$; and the data of the output terminal Q of the flip-flop 112-3 is referred to as data $X_2$.

The look-up table circuit 120 has multiple processed signals $E_0$ to $E_{15}$. The processed signals $E_0$ to $E_{15}$ are obtained from multiple coefficients through logic operations. In detail, the processed signals $E_0$ to $E_{15}$ are all possible output signals in the finite impulse response filter 10 in FIG. 1. The number of bits of each of the processed signals $E_0$ to $E_{15}$ is 8. For the detailed operation of the look-up table circuit 120, please refer to FIG. 3 and the corresponding description below.

The input terminal of the selection circuit 130 is coupled to the look-up table circuit 120. The control terminal of the selection circuit 130 receives the shifted input data (i.e., the MSB input data SC_MSB and the LSB input data SC_LSB). The selection circuit 130 selects at least one of the processed signals $E_0$ to $E_{15}$ of the look-up table circuit 120 as a selected signal (for example, a selected signal S4) based on the shifted input data (the MSB input data SC_MSB and the LSB input data SC_LSB). The output terminal Dout provides an output signal (for example, a 7-bit output signal Sout) according to the selected signal S4.

The selection circuit 130 in FIG. 2 includes a first multiplexer 132-1, a second multiplexer 132-2, a divider 140 and a signal adder 150. The first multiplexer 132-1 is coupled to the look-up table circuit 120. The first multiplexer 132-1 selects one of the processed signals $E_0$ to $E_{15}$ from the look-up table circuit 120 as a first selected signal S1 based on the MSB input data SC_MSB. The second multiplexer 132-2 is coupled to the look-up table circuit 120. The second multiplexer 132-2 selects one of the processed signals $E_0$ to $E_{15}$ from the look-up table circuit 120 as a second selected signal S2 based on the LSB input data SC_LSB. The divider 140 is coupled to the output terminal of the second multiplexer 132-2. The divider 140 divides the second selected signal S2 by two to generate a divided second selected signal S3. The divider 140 of the embodiment is a right-shift shifter, and the right-shift shifter shifts the second selected signal S2 to the right by one bit, which is to divide the number by 2, to generate the divided second selected signal S3. The signal adder 150 is coupled to the output terminal of the first multiplexer 132-1 and the output terminal of the divider 140. The signal adder 150 sums the first selected signal S1 and the divided second selected signal S3 to generate the selected signal S4. The number of bits of the first selected signal S1, the number of bits of the second selected signal S2, the number of bits of the divided second selected signal S3 and the number of bits of the selected signal S4 are all 8.

The feed-forward equalizer 100 in FIG. 2 further includes a bit reduction circuit 160. The bit reduction circuit 160 is coupled to the selection circuit 130 and the output terminal Dout. The bit reduction circuit 160 reduces the number of bits of the selected signal S4 from the original 8 bits to the same number of bits (i.e., 7 bits) of the output signal Sout of the feed-forward equalizer 100. For the resolution of the digital-to-analog converter in the transmitter, the feed-forward equalizer 100 of the embodiment of the disclosure uses the resolution of expanding one bit, that is to say, the number of bits (8 bits) of the data to be calculated in the feed-forward equalizer 100 of the embodiment of the disclosure is one bit more than the number of bits (7 bits) of the output signal Sout. The above-mentioned extended 1-bit value is configured to represent the first decimal place in the data of the output signal Sout, so the average error value can be reduced to within a minimum bit. In the embodiment of the disclosure, when the number of bits of the output signal of the digital-to-analog converter of the feed-forward equalizer 100 is 7 bits, the feed-forward equalizer 100 uses an 8-bit algorithm and a corresponding circuit structure, uses the effective first 7 bits to represent an integer and the 8th bit to represent a decimal, and then simplifies the 8th bit in the data after calculating the result. In the embodiment, the bit reduction circuit 160 is directly used to omit the 8th bit in the selected signal S4, and retain the value of the first 7 bits in the selected signal S4 as the output signal Sout.

Figure 3:
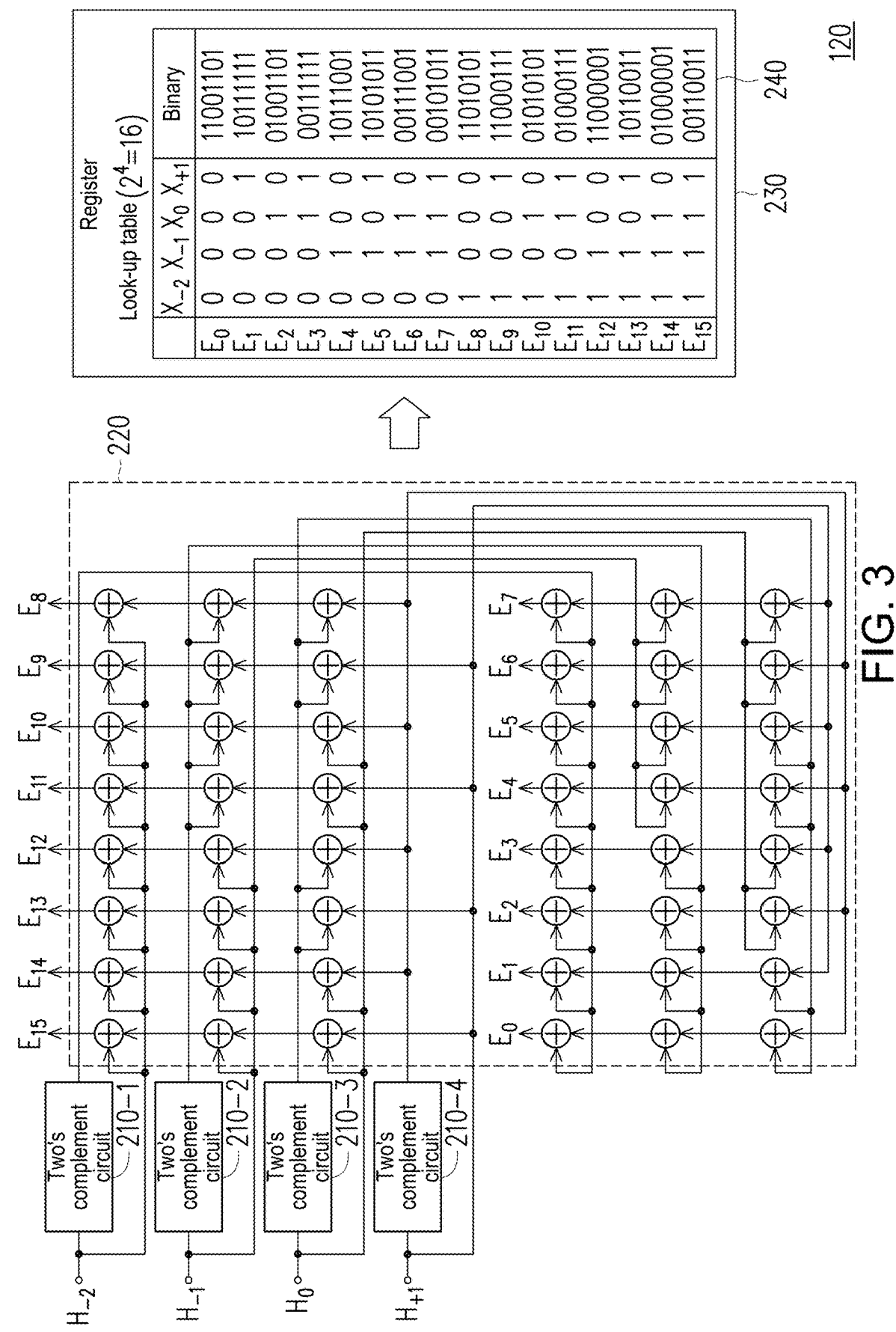
FIG. 3 is a schematic diagram of the look-up table circuit in FIG. 2.

FIG. 3 is a schematic diagram of the look-up table circuit 120 in FIG. 2. The look-up table circuit in FIG. 3 includes multiple two's complement circuits 210-1 to 201-4, an adder array 220 and a register 230. The two's complement circuits 210-1 to 201-4 respectively receive multiple coefficients, and the embodiment takes four coefficients $H_{-2}$, $H_{-1}$, $H_0$ and $H_{+1}$ as an example. In detail, the feed-forward equalizer 100 of the embodiment of the disclosure may use the method coefficient distribution to autonomously determine the position of the cursor to be compensated, effectively increasing the degree of freedom of circuit operation without increasing hardware costs.

Referring to FIG. 3, each of the two's complement circuits 210-1 to 201-4 respectively converts the corresponding coefficients into multiple two's complement coefficients. The adder array 220 is coupled to the two's complement circuits 210-1 to 210-4. The adder array 220 performs combinatorial logic calculation on the aforementioned two's complement coefficients to obtain the processed signals $E_0$ to $E_{15}$. In detail, the processed signals $E_0$ to $E_{15}$ are all possible output signals in the finite impulse response filter 10 in FIG. 1. The look-up table circuit in FIG. 3 is an example of a filter with 4 cursors, and the 4 cursors (the pre-cursor, the main-cursor and the post-cursor) correspond to the coefficients $H_{-2}$, $H_{-1}$, $H_0$ and $H_{+1}$ respectively. In the embodiment, the processed coefficients $E_0$ to $E_{15}$ are stored in a memory element (for example, the register 230) of the look-up table circuit. The number of registers may be the power of two to the number of coefficients. The embodiment has 4 coefficients/4 cursors, so the number of registers is the fourth power of two ($2^4$=16). Therefore, a total of 16 types of effective combinatorial logic calculation results (i.e., the processed signals $E_0$ to $E_{15}$) are available based on the 4 cursors, regardless of the input signal, selection may be made by the processed signals $E_0$ to $E_{15}$ generated by the look-up table circuit 120 in FIG. 3, so that the power consumption is mainly consumed in the selection circuit 130 in FIG. 2, thereby preventing the feed-forward equalizer 100 from repeatedly performing combinational logic operations. In this way, the output signal of the combinatorial logic that is repeatedly calculated may be changed to directly select the corresponding output signal from the register 230 of the look-up table circuit 120 according to the input signal, and a part of the power consumption of the feed-forward equalizer 100 may be transferred to the selection circuit 130 from the original combinatorial logic circuit (for example, multiple multipliers operating continuously), thereby saving the power consumption of the circuit in the embodiment of the disclosure.

A look-up table 240 in the register 230 in FIG. 3 is an example proposed by the embodiment of the disclosure. It is assumed that the number represented by the coefficient $H_{-2}$ is "0.05" (the two's complement type is "00000010"), the number represented by the coefficient $H_{-1}$ is "−0.12" (the two's complement type is "11110110"), the number represented by the coefficient $H_0$ is "0.75" (the two's complement type is "01000000") and the number represented by the coefficient $H_{+1}$ is "−0.08" (the two's complement type is "11111001"). According to the two's complement types of the aforementioned coefficients (i.e., the two's complement coefficients), the adder array 220 performs 16 modes of combinatorial logic calculations corresponding to the two's complement coefficients before obtaining the respective binary values of the processed signals $E_0$ to $E_{15}$ as presented in the look-up table 240.

Compared with the feed-forward equalizer using the finite impulse response filter 10 in FIG. 1, the feed-forward equalizer using the finite impulse response filter 10 needs an additional driver as a compensation circuit in order to maintain a fixed output impedance. For example, when the pre-cursor compensation coefficient in the feed-forward equalizer increases, the main-cursor or post-cursor compensation coefficient needs to correspondingly decrease and the output impedance is maintained. In this way, the feed-forward equalizer using the finite impulse response filter 10 requires additional design of the compensation range of the circuit, which also means that additional hardware costs are required to realize the function of the feed-forward equalizer. Relatively speaking, the feed-forward equalizer 100 in FIG. 2 of the embodiment of the disclosure is equivalent to distributing the function of the combinational logic operation to the digital signal processing circuit. Thus, the burden of the analog circuit in the feed-forward equalizer can be reduced.

Figure 4A:
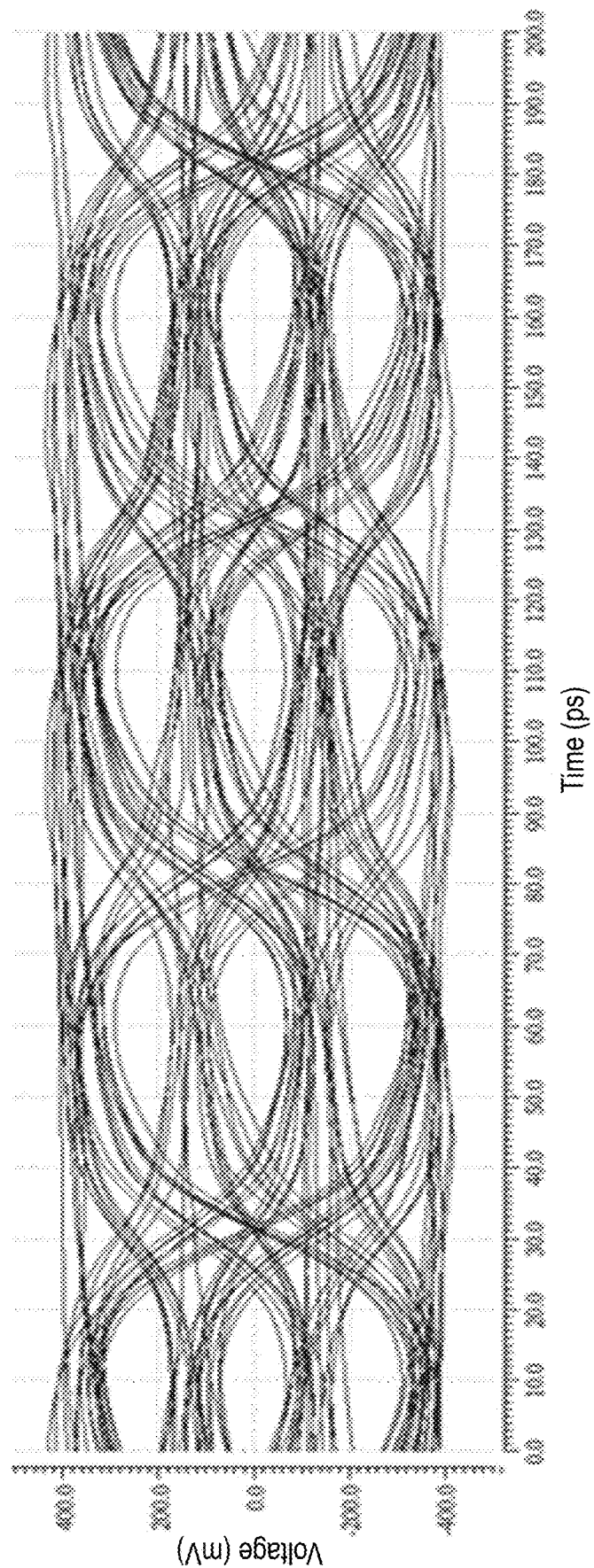
FIGS. 4A and 4B are data eye diagrams of the feed-forward equalizer realized by the finite impulse response filter in FIG. 1 and the feed-forward equalizer in FIG. 2 respectively.
Figure 4B:
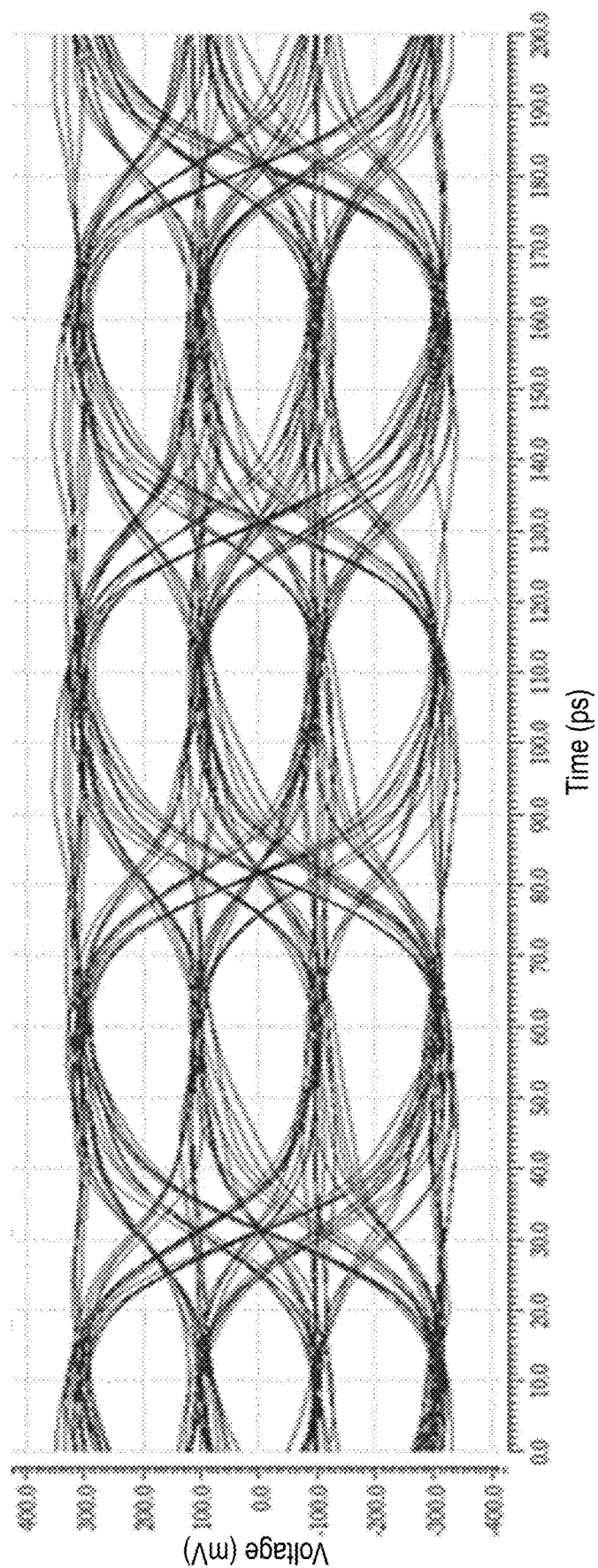

FIGS. 4A and 4B are data eye diagrams of the feed-forward equalizer realized by the finite impulse response filter 10 in FIG. 1 and the feed-forward equalizer 100 in FIG. 2 respectively. In other words, FIG. 4B is a data eye diagram of channel compensation performed by the feed-forward equalizer 100 according to an embodiment of the disclosure. It may be seen from the comparison of FIG. 4A and FIG. 4B that the eye height and eye width of the data eye diagram in FIG. 4B have significantly increased compared with FIG. 4A, and the jitter and inter-symbol interference of the data eye diagram in FIG. 4B also have obvious optimization over FIG. 4A.

In addition, if the feed-forward equalizer realized by the finite impulse response filter 10 in FIG. 1 and the feed-forward equalizer 100 in FIG. 2 are simulated, the output waveforms of the two feed-forward equalizers are almost exactly the same under the situation where the compensation coefficients are the same. It may be seen that the algorithm inside the feed-forward equalizer in the embodiment of the disclosure may achieve quite precise control of the compensation amount, and the errors between the compensation amount and the ideal value are all less than one minimum bit under different compensation coefficients. For example, in the PCIE specification, under 189 kinds of compensation coefficients, the error voltage between the completely ideal feed-forward equalizer and the feed-forward equalizer of the embodiment of the disclosure have errors based on the resolution of digital signal processing. Moreover, the aforementioned two feed-forward equalizers can control their errors within one minimum bit of the driver, which is in line with the allowable range in the specification.

To sum up, the feed-forward equalizer implemented based on the digital signal processing in the embodiment of the disclosure uses a fixed amount of hardware under different channel compensation amounts. In this way, the output impedance of the driver itself can be fixed, which facilitates channel impedance matching. Moreover, the feed-forward equalizer uses the two's complement form to weight and sum the coefficients of the data in the input signal, so that the combinational logic operation in the circuit may be realized with multiple adders, thereby avoiding the use of the multiplier, which not only can maintain the advantage of resisting channel attenuation, but also reduce the loss of circuit area and power consumption. The embodiment of the disclosure further allows the feed-forward equalizer to autonomously determine the position of the cursor to be compensated through coefficient distribution, thereby effectively improving the degree of freedom of circuit operation without increasing hardware costs. The feed-forward equalizer of the embodiment of the disclosure uses the resolution of expanding one bit so that the average error value is reduced to within one minimum bit.

What is claimed is:

1. A feed-forward equalizer, comprising:
   a shift register, temporarily storing and shifting input data based on a clock signal to obtain a plurality of shifted input data;
   a look-up table circuit, having a plurality of processed signals, wherein the processed signals are obtained by logical operation of a plurality of coefficients;
   a selection circuit, an input terminal thereof being coupled to the look-up table circuit, a control terminal of the selection circuit receiving the shifted input data, and the selection circuit selecting at least one of the processed signals of the look-up table circuit as a selected signal based on the shifted input data; and
   an output terminal, providing an output signal according to the selected signal.

2. The feed-forward equalizer according to claim 1, wherein the shift register comprises:
   a most significant bit (MSB) shift register, receiving the clock signal and the input data, and configured to temporarily store and shift the input data based on the clock signal to provide a plurality of MSB input data; and
   a least significant bit (LSB) shift register, receiving the clock signal and the input data, and configured to temporarily store and shift the input data based on the clock signal to provide a plurality of LSB input data.

3. The feed-forward equalizer according to claim 2, wherein the MSB shift register and the LSB shift register are respectively composed of a plurality of flip-flops, control terminals of the flip-flops are coupled to the clock signal, an input terminal of the flip-flop of a next stage is coupled to an output terminal of the flip-flop of a previous stage, and a first one of the flip-flop receives the input data.

4. The feed-forward equalizer according to claim 2, wherein the selection circuit comprises:
   a first multiplexer, coupled to the look-up table circuit, and selecting one of the processed signals of the look-up table circuit as a first selected signal based on the MSB input data;
   a second multiplexer, coupled to the look-up table circuit, and selecting one of the processed signals of the look-up table circuit as a second selected signal based on the LSB input data;
   a divider, coupled to an output terminal of the second multiplexer, and the divider dividing the second selected signal by two to generate a divided second selected signal; and
   a signal adder, coupled to an output terminal of the first multiplexer and an output terminal of the divider, and the signal adder summing the first selected signal and the divided second selected signal to generate the selected signal.

5. The feed-forward equalizer according to claim 4, wherein the divider is a shifter, and the shifter shifts the second selected signal to the right by one bit to generate the divided second selected signal.

6. The feed-forward equalizer according to claim 4, wherein a number of bits of the MSB input data and a number of bits of the LSB input data are 4, and a number of bits of the first selected signal, a number of bits of the second selected signal, a number of bits of the divided second selected signal and a number of bits of the selected signal are all 8.

7. The feed-forward equalizer according to claim 2, wherein a number of bits of the selected signal is 8 bits, a number of bits of the output terminal is 7 bits, and the bit reduction circuit reduces 1 bit of the least significant bit in the selected signal and saves the other 7 bits to serve as the output signal.

8. The feed-forward equalizer according to claim 1, further comprising:
   a bit reduction circuit, coupled to the selection circuit and the output terminal, and the bit reduction circuit reducing a number of bits of the selected signal to be the same as a number of bits of the output signal of the feed-forward equalizer.

9. The feed-forward equalizer according to claim 1, wherein the look-up table circuit comprises:
   a plurality of two's complement circuits, respectively receiving a plurality of coefficients, wherein each of the two's complement circuits respectively converts a corresponding coefficient into a plurality of two's complement coefficients;
   an adder array, coupled to the two's complement circuit, and performing combinatorial logic calculations on the two's complement coefficients to obtain the processed signals; and
   a register, configured to temporarily store the processed signals, wherein a number of the processed signals is the power of two to a number of the coefficients.

10. The feed-forward equalizer according to claim 9, wherein a number of the coefficients is 4, and a number of the processed signals is 16.

* * * * *